(12) United States Patent
Burka et al.

(10) Patent No.: US 8,438,193 B2
(45) Date of Patent: *May 7, 2013

(54) COPY COLLECTOR WITH EFFICIENT ABORT-ON-COPY TRANSITION TO MARK COLLECTOR

(75) Inventors: Peter Wiebe Burka, Ottawa (CA); Jeffrey Michael Disher, Ottawa (CA); Daryl James Maier, Unionville (CA); Aleksandar Micic, Ottawa (CA); Ryan Andrew Sciampacone, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/431,974

(22) Filed: Mar. 28, 2012

(65) Prior Publication Data

US 2012/0239711 A1 Sep. 20, 2012

Related U.S. Application Data

(63) Continuation of application No. 13/047,779, filed on Mar. 14, 2011.

(51) Int. Cl.
*G06F 12/00* (2006.01)

(52) U.S. Cl.
USPC .......................................... 707/816; 711/172

(58) Field of Classification Search .................. 707/813, 707/816; 711/172
See application file for complete search history.

(56) References Cited

U.S. PATENT DOCUMENTS

| | | | |
|---|---|---|---|
| 5,559,957 A * | 9/1996 | Balk ................................ 714/23 |
| 6,681,306 B1 | 1/2004 | Kessler et al. | |
| 7,340,494 B1 | 3/2008 | Detlefs et al. | |
| 2007/0118579 A1 | 5/2007 | Hudson | |
| 2008/0281888 A1* | 11/2008 | Tene et al. ..................... 707/206 |

FOREIGN PATENT DOCUMENTS

EP 0969377 B1 1/2009

OTHER PUBLICATIONS

Yossi Levanoni et al., An On-the-fly Mark and Sweep Garbage Collector based on sliding views, 2003, OOPSLA/ACM.*
Ng, Tony C.; "Efficient Garbage Collection for Large Object-Oriented Databases"; Submitted to the Department of Electrical Engineering and Computer Science in partial fulfillment of the requirements for the degree of Master of Science in Electrical Engineering and Computer Science at the Massachusetts Institute of Technology; Mary, 1996.
Amsaleg, et al.; "Efficient Incremental Garbage Collection for Workstation/Server Database Systems"; In Proc. of the 21th VLDB Int. Conf., 1995.

* cited by examiner

*Primary Examiner* — Neveen Abel Jalil
*Assistant Examiner* — Jagdish Pandya
(74) *Attorney, Agent, or Firm* — Nelson and Nelson; Daniel P. Nelson; Alexis V. Nelson

(57) ABSTRACT

A method for performing garbage collection on an object heap is described. In one embodiment, such a method includes performing a copy phase on an object heap by copying live objects from a source space to a destination space. An abort condition is generated when copying an object from the source space to the destination space fails due to insufficient space. In response to the abort condition, tracing work and reference updating associated with the copy phase are terminated. A mark phase is then initiated that marks live objects in the source space. This mark phase resumes tracing work and reference updating terminated by the copy phase in order to avoid or minimize the repetition of work performed by the copy phase. A corresponding computer program product and system are also described.

6 Claims, 8 Drawing Sheets

COPY COLLECTOR WITH EFFICIENT ABORT-ON-COPY TRANSITION TO MARK COLLECTOR

BACKGROUND

1. Field of the Invention

This invention relates to memory management, and more specifically to systems and methods for collecting garbage in memory.

2. Background of the Invention

In an object-oriented managed runtime, such as the Java Virtual Machine (JVM), Microsoft Common Language Runtime (CLR), or Smalltalk runtime, the primary memory resource is a garbage-collected object heap. The object heap provides memory for objects, each of which is an instance of a class. All managed runtimes support object garbage collection. Garbage collection attempts to reclaim garbage, or memory occupied by objects that are no longer in use by programs.

Various different approaches exist for collecting garbage on the object heap, each with various advantages and disadvantages. For example, global garbage collectors collect garbage from the entire object heap, whereas local garbage collectors (e.g., region-based garbage collectors) collect garbage only from a portion of the object heap. Global garbage collectors are typically standard mark-sweep (and optionally compact) collectors. Local garbage collectors are typically copy collectors, although mark-sweep collectors may also be used.

A copy collector works, in part, by copying live objects from one space (i.e., the source space) to another space (i.e., the destination space, also referred to as the survivor space). This type of collector has the advantage that it can mark and copy live objects in a single pass over the heap. It can also achieve good locality of objects in the survivor space. One disadvantage of this type of collector is that it requires extra memory for the survivor space. The amount of memory needed for the survivor space can be difficult to predict. When the survivor space is insufficient (i.e., there are more live objects than can be copied to the survivor space), the copy process aborts. Such an abort condition requires a recovery to update stale references and bring the heap back to a consistent state.

In a mark-sweep collector, a bit is typically provided for each object in memory. Each bit is cleared prior to a garbage collection cycle. During the garbage collection cycle, an object graph is traversed, starting with root objects, until all live objects are found. The bit for each live object is set (or "marked") to indicate that the object is in use. Once each live object is marked, each object in memory may be examined again. Objects with bits cleared are not reachable by any program or data, allowing their memory to be freed. The advantage of a mark-sweep collector is that it is slightly faster than a copy collector since it doesn't write to the heap. If a compactor is invoked, which may slide objects toward a low or high address of the source space, there is typically no need for a separate survivor space. Thus, a mark-sweep-compact collector is free from the abort problems associated with a copy collector—the mark-sweep-compact is guaranteed to complete successfully. The disadvantage is that, in the event the compactor is invoked frequently, the mark and compact processes together require two passes through the live objects.

In the event a copy collector aborts the copy of an object due to insufficient space in the destination space, recovering can be quite expensive. For example, such an event may require an explicit pass through the heap to fix stale heap references. If accurate mark bit information is required, a marking operation may also need to be performed on the entire collection set. A collector with an explicit fix-up phase and complete mark phase, when an abort occurs, is typically two to three times slower than a copy collector that successfully completes the garbage collection process with no abort.

In view of the foregoing, what is needed is a copy collector able to efficiently transition to a mark collector when an abort occurs. Ideally, if an abort does occur, the operation of the copy collector and mark collector together will be almost as fast and efficient as the copy collector completing by itself without an abort. If an abort does occur, techniques are needed to enable the mark collector to resume tracing work and reference updating already performed by the copy collector with minimal repetition of work.

SUMMARY

The invention has been developed in response to the present state of the art and, in particular, in response to the problems and needs in the art that have not yet been fully solved by currently available systems and methods. Accordingly, the invention has been developed to provide improved systems and methods for performing garbage collection on an object heap. The features and advantages of the invention will become more fully apparent from the following description and appended claims, or may be learned by practice of the invention as set forth hereinafter.

Consistent with the foregoing, a method for performing garbage collection on an object heap is disclosed herein. In one embodiment, such a method includes performing a copy phase on an object heap by copying live objects from a source space to a destination space. An abort condition is generated when copying an object from the source space to the destination space fails due to insufficient space. In response to the abort condition, tracing work and reference updating associated with the copy phase are terminated. A mark phase is then initiated that marks live objects in the source space. This mark phase resumes tracing work and reference updating terminated by the copy phase in order to avoid or minimize the repetition of work performed by the copy phase.

A corresponding computer program product and system are also disclosed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
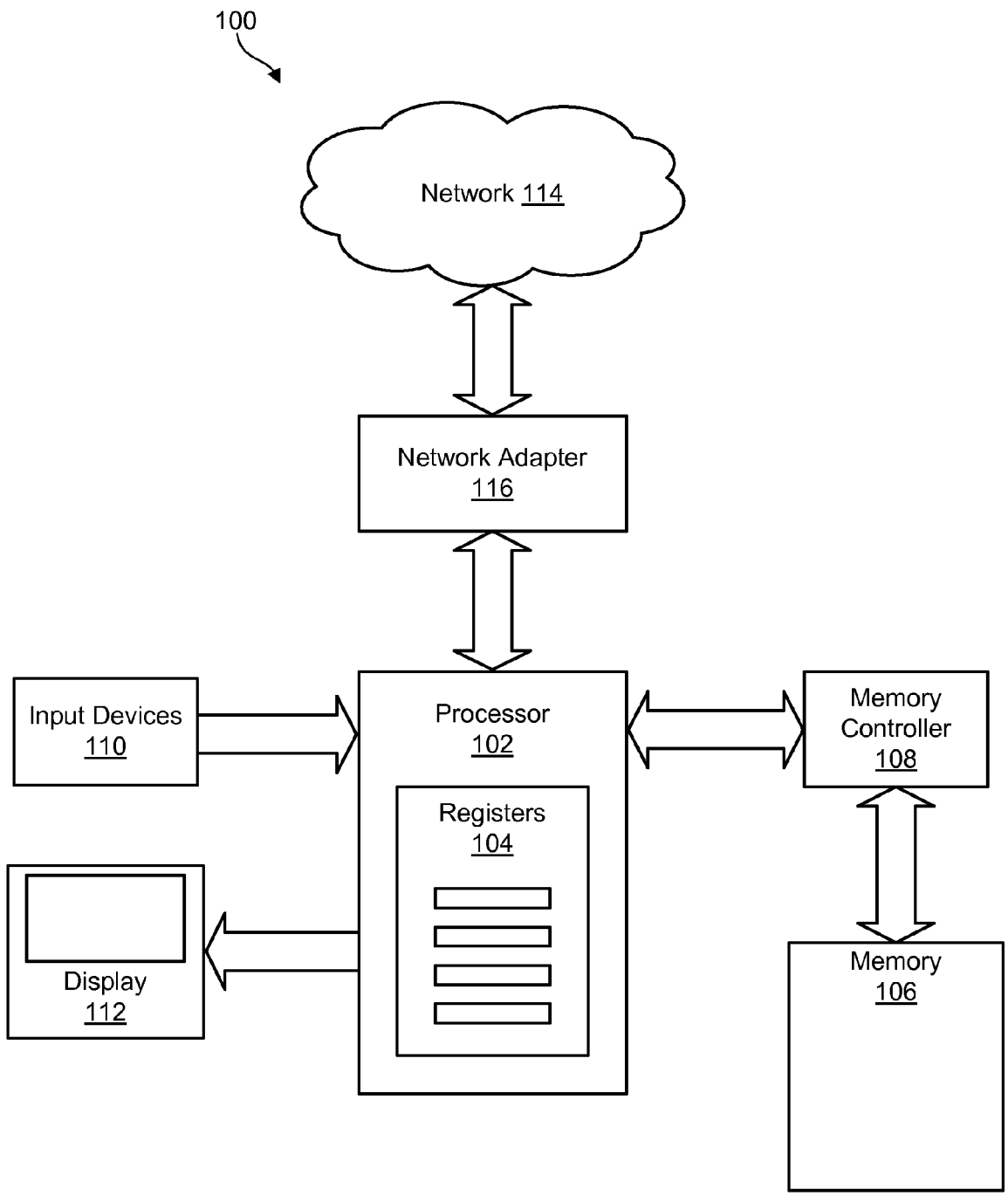
FIG. 1 is a high-level block diagram showing one example of a computer system suitable for use with various embodiments of the invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, method, or computer program product. Furthermore, the present invention may take the form of a hardware embodiment, a software embodiment (including firmware, resident software, microcode, etc.) configured to operate hardware, or an embodiment combining software and hardware aspects that may all generally be referred to herein as a "module" or "system." Furthermore, the present invention may take the form of a computer-usable storage medium embodied in any tangible medium of expression having computer-usable program code stored therein.

Any combination of one or more computer-usable or computer-readable storage medium(s) may be utilized to store the computer program product. The computer-usable or computer-readable storage medium may be, for example but not limited to, an electronic, magnetic, optical, electromagnetic, infrared, or semiconductor system, apparatus, or device. More specific examples (a non-exhaustive list) of the computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, or a magnetic storage device. In the context of this document, a computer-usable or computer-readable storage medium may be any medium that can contain, store, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. Computer program code for implementing the invention may also be written in a low-level programming language such as assembly language.

The present invention may be described below with reference to flowchart illustrations and/or block diagrams of methods, apparatus, systems, and computer program products according to various embodiments of the invention. It will be understood that each block of the flowchart illustrations and/or block diagrams, and combinations of blocks in the flowchart illustrations and/or block diagrams, may be implemented by computer program instructions or code. The computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer or other programmable data processing apparatus to function in a particular manner, such that the instructions stored in the computer-readable storage medium produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, one example of a computer system 100 is illustrated. The computer system 100 is presented to show one example of an environment where a system and method in accordance with the invention may be implemented. The computer system 100 is presented only by way of example and is not intended to be limiting. Indeed, the systems and methods disclosed herein may be applicable to a wide variety of different computer systems in addition to the computer system 100 shown. The systems and methods disclosed herein may also potentially be distributed across multiple computer systems 100.

The computer system 100 includes at least one processor 102 and may include more than one processor 102. The processor 102 includes one or more registers 104 storing data describing the state of the processor 102 and facilitating execution of software systems. The registers 104 may be internal to the processor 102 or may be stored in a memory 106. The memory 106 stores operational and executable data that is operated upon by the processor 102. The memory 106 may be accessed by the processor 102 by means of a memory controller 108. The memory 106 may include volatile memory (e.g., RAM) as well as non-volatile memory (e.g., ROM, EPROM, EEPROM, hard disks, flash memory, etc.).

The processor 102 may be coupled to additional devices supporting execution of software and interaction with users. For example, the processor 102 may be coupled to one or more input devices 110, such as a mouse, keyboard, touch screen, microphone, or the like. The processor 102 may also be coupled to one or more output devices such as a display device 112, speaker, or the like. The processor 102 may communicate with one or more other computer systems by means of a network 114, such as a LAN, WAN, or the Internet. Communication over the network 114 may be facilitated by a network adapter 116.

Figure 2:
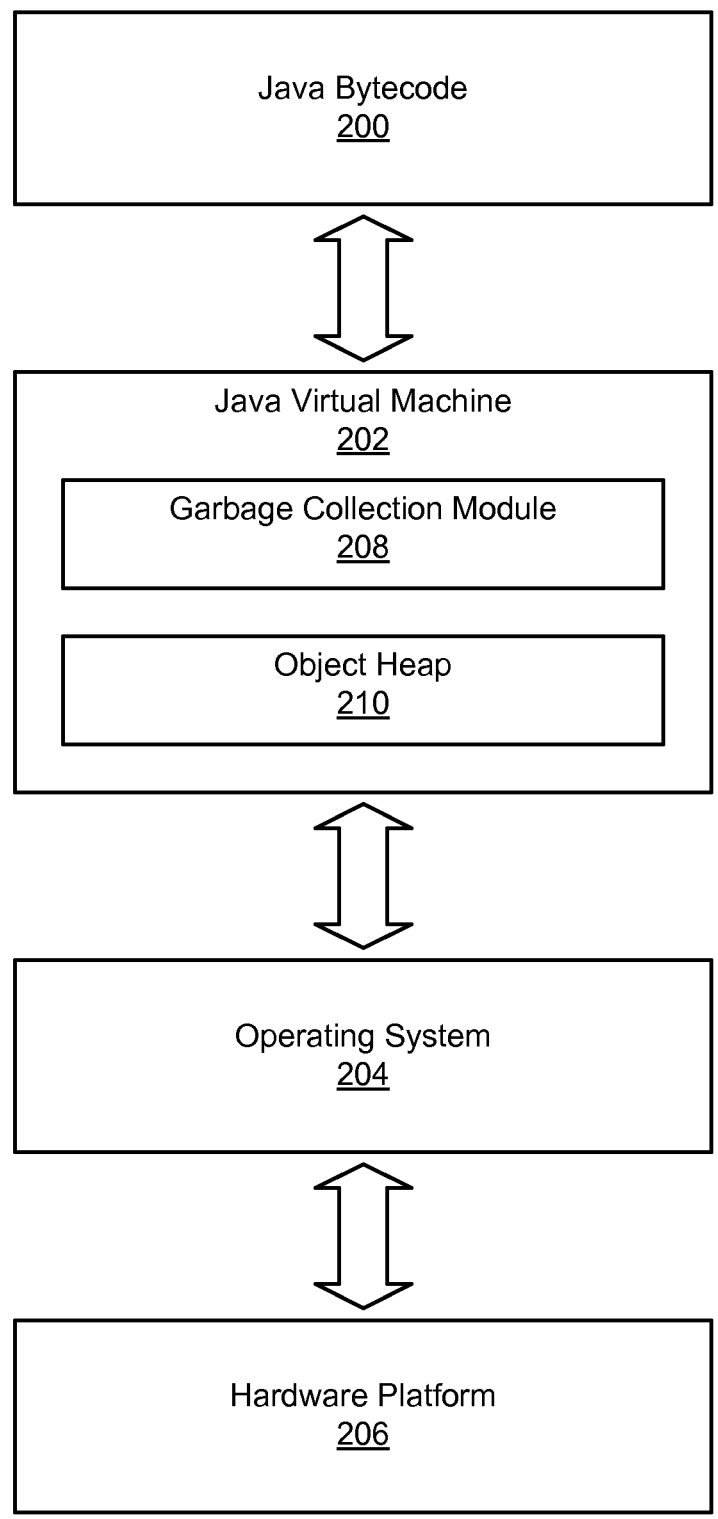
FIG. 2 is a high-level block diagram showing one example of an object-oriented managed runtime, in this example the Java Virtual Machine, incorporating a garbage collection module in accordance with the invention.

Referring to FIG. 2, one example of an object-oriented managed runtime, in this example the Java Virtual Machine, is illustrated. The Java Virtual Machine is presented to show one example of a runtime environment in which various embodiments of the invention may operate. Nevertheless, the garbage collection techniques disclosed herein are not limited to the Java Virtual Machine but may operate or be adapted to operate in any object-oriented managed runtime that uses an object heap to store objects. Other non-limiting examples of runtime environments in which embodiments of the invention might operate or be adapted to operate include the Microsoft Common Language Runtime (CLR) and Smalltalk runtime. Thus, although particular reference is made herein to the Java Virtual Machine, the principles taught herein are not limited to the Java Virtual Machine but may also be applicable to other runtime environments.

As shown in FIG. 2, a Java Virtual Machine 202 may be configured to operate on a specific platform, which may include an underlying hardware and operating system platform 204, 206. As shown, the Java Virtual Machine 202 receives program code 200, compiled to an intermediate form referred to as "bytecode" 200. The Java Virtual Machine 202 translates this bytecode 200 into native operating system calls and machine instructions for execution on the underlying platform 204, 206. Instead of compiling the bytecode 200 for the specific hardware and software platform 204, 206, the bytecode 200 is compiled once to operate on all Java Virtual Machines 202. A Java Virtual Machine 202, by contrast, may be tailored to the underlying hardware and software platform 204, 206. In this way, the Java bytecode 200 may be considered platform independent.

In the Java Virtual Machine 202, the primary memory resource is a garbage-collected object heap 210. The object heap 210 provides memory for objects, each of which is an instance of a class. A garbage collection module 208, or subsystem 208, is provided in the Java Virtual Machine 202 to reclaim memory occupied by objects, or classes associated with objects, that are no longer in use by a program or application. Among other benefits, the garbage collection module 208 frees a programmer from worrying about releasing objects that are no longer needed, which would otherwise require significant design effort from the programmer.

In order to reduce pause times, the garbage collection module 208 may, in certain embodiments, be configured to operate in an incremental manner. That is, the garbage collection module 208 may be configured to perform garbage collection processes on a portion of the object heap 210 at a time, as opposed to the entire object heap 210. For example, in selected embodiments, the object heap 210 may be divided into a number of regions (e.g., hundreds or even thousands of regions). The garbage collection module 208 may then perform garbage collection on a subset of these regions (also referred to as a "collection set") at any particular time. This incremental garbage collection process minimizes, as much as possible, disruption of a main program or application. The systems and methods disclosed herein are not limited to region-based garbage collection, but may be used in any incremental garbage collector that performs partial heap collection.

Figure 3:
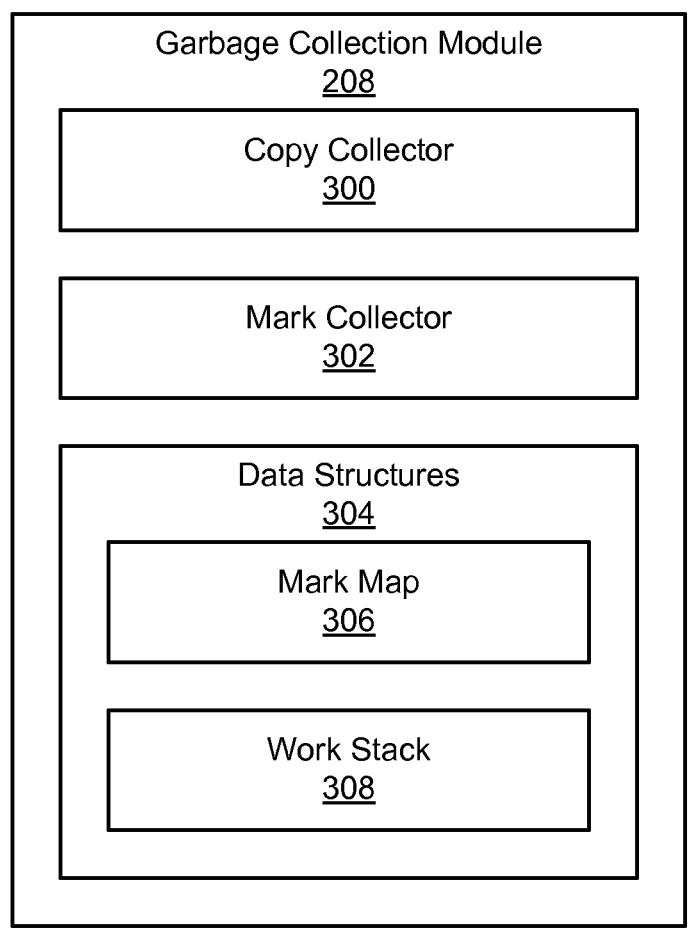
FIG. 3 shows one example of a garbage collection module comprising a copy collector, a mark collector, and various related data structures.

Referring to FIG. 3, a more detailed view of various components of a garbage collection module 208 in accordance with the invention is illustrated. As shown, the garbage collection module 208 includes a copy collector 300, a mark collector 302, and various data structures 304 that are used by the copy collector 300 and mark collector 302 to efficiently perform garbage collection. The data structures 304 may include both a mark map 306 and a work stack 308, the functions of which will be described in more detail hereafter.

The copy collector 300 may perform garbage collection by copying live objects from a source space to a destination space. The process is referred to herein as the "copy phase." This type of collector has the advantage that it can mark and copy live objects in a single pass over the heap and it can achieve good locality of objects in the destination space. When the destination space is insufficient (i.e., there are more live objects in the source space than can be stored in the destination space), the copy process aborts. When an abort occurs, a mark collector 302 may be invoked. The mark collector 302 may be used to mark the remaining live objects in the source space so that any dead objects can be reclaimed to free up memory. This process is referred to herein as the "mark phase." If desired, once the mark phase is complete, the live objects may be compacted to remove any intervening holes or gaps.

When an abort occurs, the mark map 306 and work stack 308 enable the copy collector 300 to seamlessly and efficiently transition to the mark collector 302, with minimal repetition of work. More specifically, the mark map 306 and work stack 308 enable the mark collector 302 to resume tracing work and reference updating performed by the copy collector 300. No explicit reference fix-up phase between the copy phase and mark phase is required. The manner in which the mark map 306 and work stack 308 enable the mark collector 302 to resume tracing work and reference updating of the copy collector 300 will be described in more detail in association with FIGS. 4 through 8.

Figure 4:
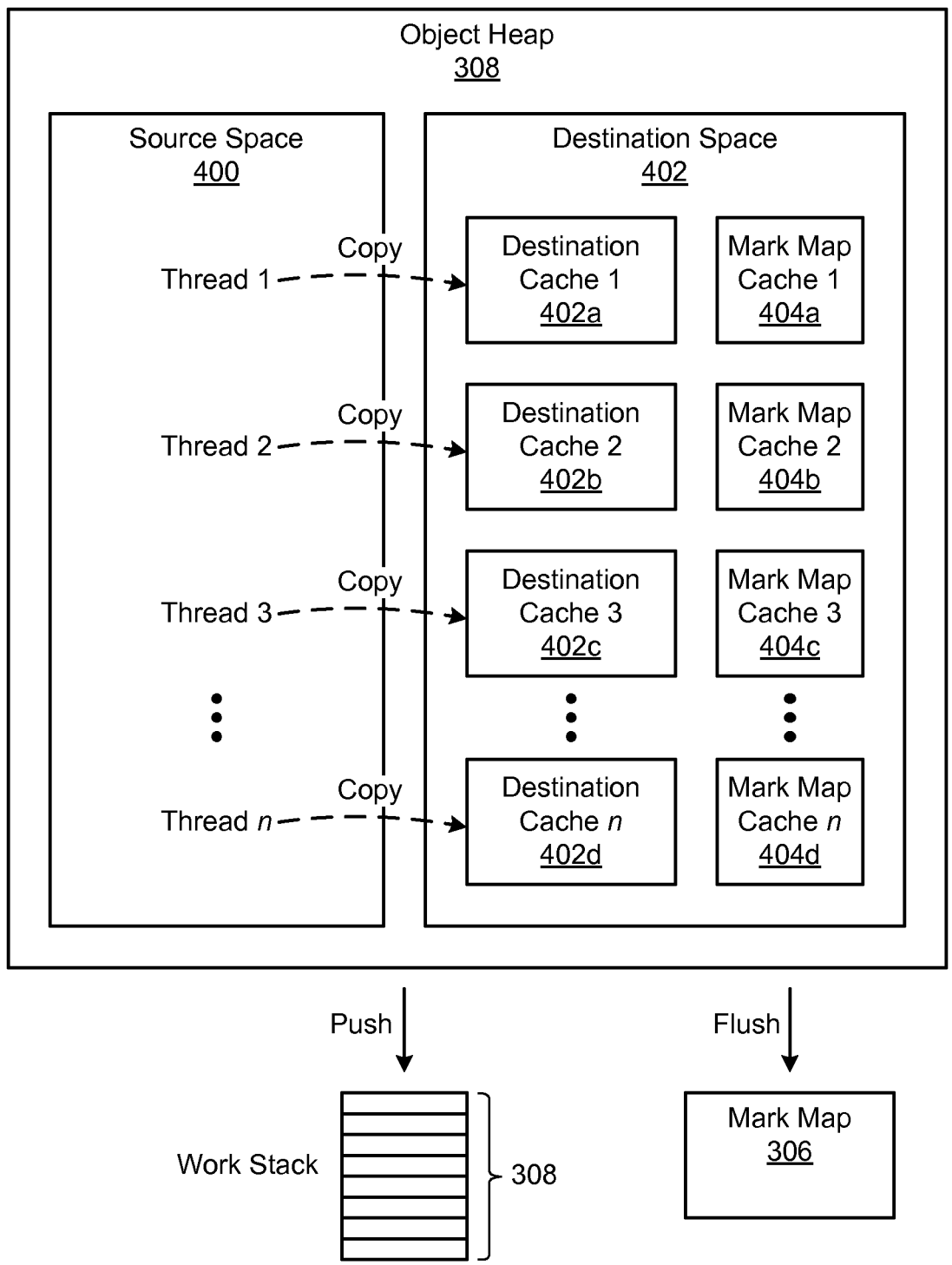
FIG. 4 shows operation of the copy collector in a multi-threaded environment.

Referring to FIG. 4, during the copy phase, multiple threads may work in parallel to copy live objects from a source space 400 to a destination space 402. Each thread may be assigned its own destination cache 402a-d within the destination space 402 into which to copy live objects. If one of the threads cannot copy an object due to insufficient space in its destination cache 402, the copy is terminated and an abort condition is generated. Each remaining thread may continue to copy objects from the source space 400 to its destination cache 402 until all objects are copied or until an abort condition is generated due to insufficient space.

When a thread aborts copying an object due to insufficient space in its destination cache 402, the thread pushes the object that referred to this object (also called the "referrer object") onto the work stack 308. This referrer object will be picked up later by the mark collector 302 when resuming tracing work. Pushing the referrer object (which is known to be successfully copied) instead of the referred object (i.e., the object that failed to copy) will cause some minor repetition of work by the mark collector 302. However, this technique ensures that, in a multi-threaded environment, all threads see a consistent view of objects that have been successfully copied. If a first thread were to push the referred object (rather than the referrer object) onto the work stack 308, while a second thread successfully copied the referred object to its destination cache 402, the object heap 210 would end up in an inconsistent state where objects could refer to different (both seemingly valid) copies of a single object. By pushing the referrer object as opposed to the referred object onto the work stack 308, this problem is avoided.

In certain embodiments, the copy collector 300 is configured to maintain marked bit information in a mark map structure 306. As will be explained in more detail hereafter, this will enable the mark collector 302 to resume tracing if and when an abort occurs. In a multi-threaded environment, a mark collector 302 would typically need to use atomic operation on each mark operation performed on the mark map structure 306. The copy collector 300, on the other hand, may have a lower cost of maintaining the mark map structure 306. More specifically, each thread of the copy collector 300 may perform mark operations on a mark map cache 404*a-d* reserved exclusively for the thread, instead of directly on the mark map structure 306. Since only a single thread accesses each mark map cache 404*a-d*, atomic operations are not needed. The mark map caches 404*a-d* may be eventually flushed to the master mark map 306, in which case atomic operation may be necessary, but only at the boundaries of each mark map cache 404*a-d*.

Referring to FIGS. 5A through 5D, as previously mentioned, in the event the copy collector 300 aborts a copy operation due to insufficient space, the copy collector 300 transitions to a mark collector 302. The mark collector 302 then marks live objects remaining in the source space 400 in order to free up memory. If desired, the live objects may then be compacted, such as by sliding the objects toward a high or low address of the source space 400, to remove holes or gaps therebetween.

Figure 5A:
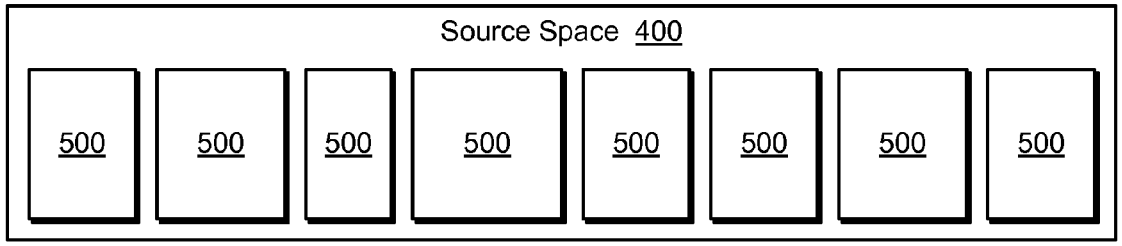
FIGS. 5A through 5D show operation of the mark (and optionally sweep and compact) collector.
Figure 5B:
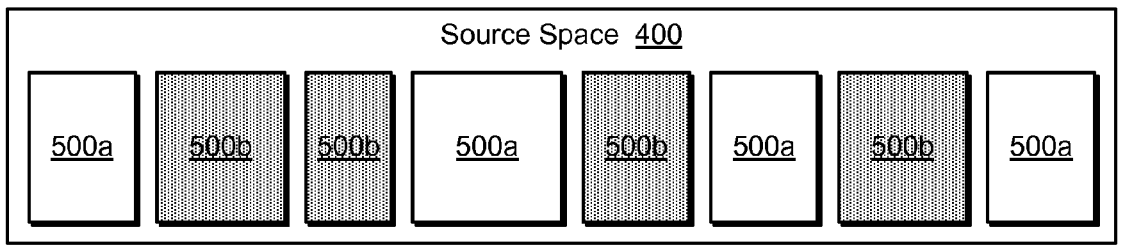
Figure 5C:
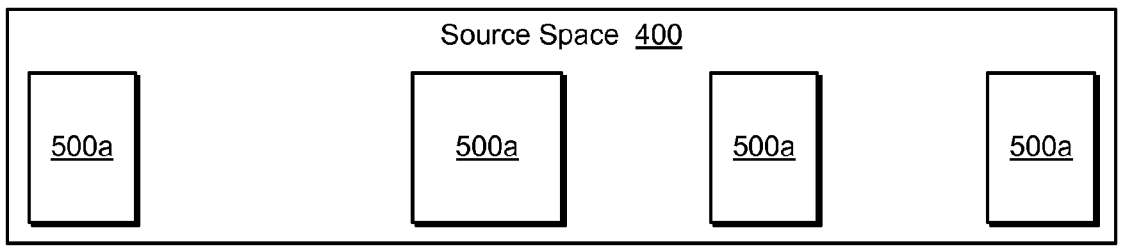
Figure 5D:
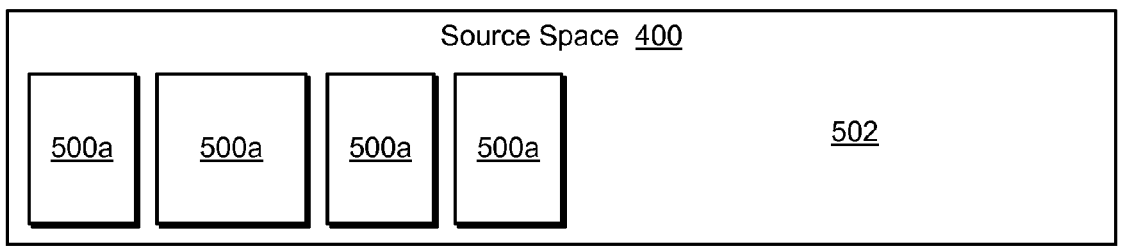

FIGS. 5A through 5D show a general mark-sweep-compact process. As shown in FIG. 5A, after an abort has occurred, a source space 400 may still contain one or more objects 500. The mark collector 302 may resume the tracing work of the copy collector 300, starting with root objects, to discover all live objects 500*a* remaining in the source space 400. As shown in FIG. 5B, the mark collector 302 marks each live object 500*a* that it discovers during traversal of the object graph. All remaining objects 500*b* are considered dead (unreachable) or live but already copied and forwarded to the destination space 402 (in which case they may be treated as dead). The mark collector 302 may then sweep the source space 400 to free memory occupied by these objects 500*b*, as shown in FIG. 5C. If desired, a compaction process may compact the remaining live objects 500*a* by moving the objects 500*a* toward a low or high address of the source space 400, thereby creating a contiguous space 502, as shown in FIG. 5D. New objects may be allocated within the contiguous space 502.

Figure 6:
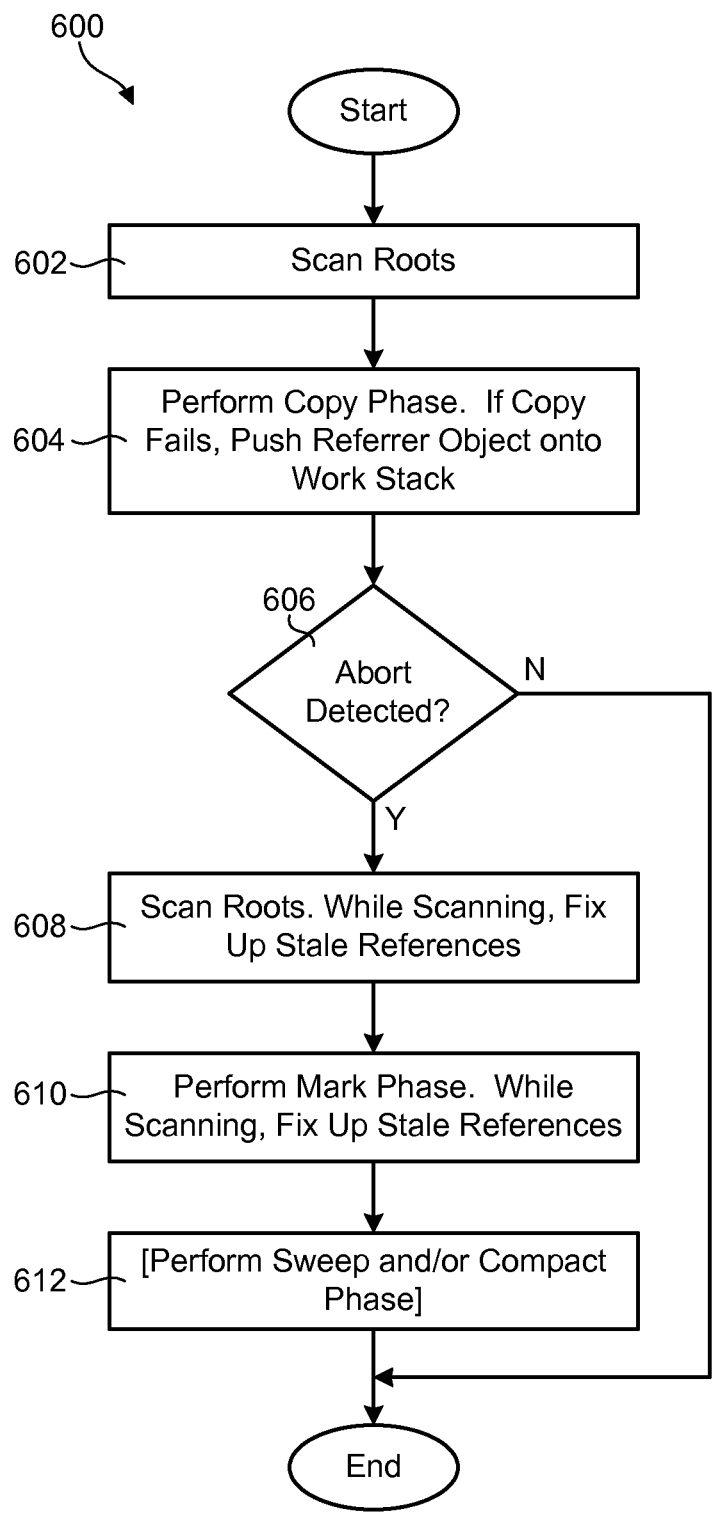
FIG. 6 shows one embodiment of a method for performing garbage collection on an object heap using the copy collector and mark collector.

Referring to FIG. 6, one embodiment of a method 600 for performing garbage collection using a copy collector 300 and mark collector 302 in accordance with the invention is illustrated. As shown, the method 600 initially scans 602 the root objects to find any objects that the root objects reference. The method 600 then performs 604 the copy phase, which traverses the object graph. During the traversal, multiple threads work in parallel to move live objects from the source space 400 to their respective destination caches 402. When an object is moved to a destination cache 402, its mark bit is set in the corresponding mark map cache 404. If, while attempting to move an object from the source space 400 to a destination cache 402, the copy is aborted due to insufficient space in the destination cache 402, the referrer object (which is known to already be copied and marked) is pushed onto the work stack 308. This process is documented in FIG. 7. In certain embodiments, if an abort occurs, a global flag may be set to an "abort detected" state. This flag may be later queried to determine if the mark phase is required or not. Once a thread finishes the copy phase (either runs out of space in its destination cache or successfully copies all objects to its destination cache 402), it flushes its mark map cache 404 to the mark map structure 306 and waits to be synchronized with other threads. Once all threads are synchronized, the threads may start the mark phase, if necessary.

If the method 600 determines 606 that all threads completed the copy phase without aborting, the method 600 ends. If, however, the method 600 determines 606 that at least one thread aborted while copying an object, the method 600 transitions to the mark phase. If needed, the method 600 rescans 608 the root objects to update any stale references they may contain. The method then performs 610 the mark phase by popping objects from the work stack 308 (such as those pushed onto the work stack 308 during the copy phase or during root rescanning 608) and traversing the object graph from these objects. Upon popping an object from the work stack 308, the method 600 performs the following for each reference slot in the object: First, if the object being referenced has already been copied from the source space 400 to the destination space 402 and the reference still points to the old location of the object, the reference slot is updated to reflect the object's new location. This process is documented in FIG. 8. Second, if the object being referenced has not been copied, it is atomically marked and, if marking is successful, the object is pushed onto the work stack 308. In this way, the mark phase is able to resume tracing work and reference updating terminated by the copy phase, with minimal repetition of work. Once all tracing work and reference updating have been completed, the method 600 optionally sweeps 612 and/or compacts 612 the live objects in the source space 400. In certain embodiments, the compactor is a standard "sliding" style of compactor, ideally with a separate planning phase, that does not require extra memory and thus is free from the abort problems previously discussed.

As shown in FIG. 6, the copy phase attempts to copy all live objects from the source space 400 to the destination space 402. It is only when the copy phase does not complete successfully (i.e., one or more copy operations are aborted due to insufficient space in the destination space 402) that the mark phase is invoked. Regardless of whether the copy phase completes successfully or the copy phase aborts and transitions to the mark phase, two rules may be enforced to preserve correctness. These rules include: (1) all live objects need to be marked; and (2) all references to objects that have been copied to the destination space 402 need to be updated to reflect their new locations. The disclosed method 600 may preserve correctness using both of these rules, while enabling efficient transition between the copy phase and mark phase. In particular, the copy phase may be configured to preserve correctness using the first rule, while the mark phase may be configured to preserve correctness using the second rule.

During initial root scanning 602, if an attempt to copy an object referenced by a root object fails, no referrer object is pushed onto the work stack 308 since root objects are not subject to movement (a root object is not part of the heap or if it is part of the heap, it is not part of the collection set). The referenced object also cannot be pushed onto the work stack 308 since this could cause the object heap 210 to end up in an inconsistent state where objects refer to different (both seemingly valid) copies of a single object. To compensate for not copying the root object or the referenced object to the work stack 308, the roots are rescanned at step 608. This rescanning 608 fixes any stale references in the root objects not fixed by the initial root scanning 602. It also allows the mark phase to resume tracing work from the root objects.

In certain embodiments, rescanning 608 can be partial. Often, there is more than one phase in root scanning, separated by a thread synchronization barrier. The rescanning 608 may start from the first phase where the abort was detected. The earlier phases that succeeded with no abort do not have to be rescanned 608. If an abort did not occur during initial scanning 602, but rather occurred during the main copy phase 604, the root rescanning step 608 may be skipped altogether.

Figure 7:
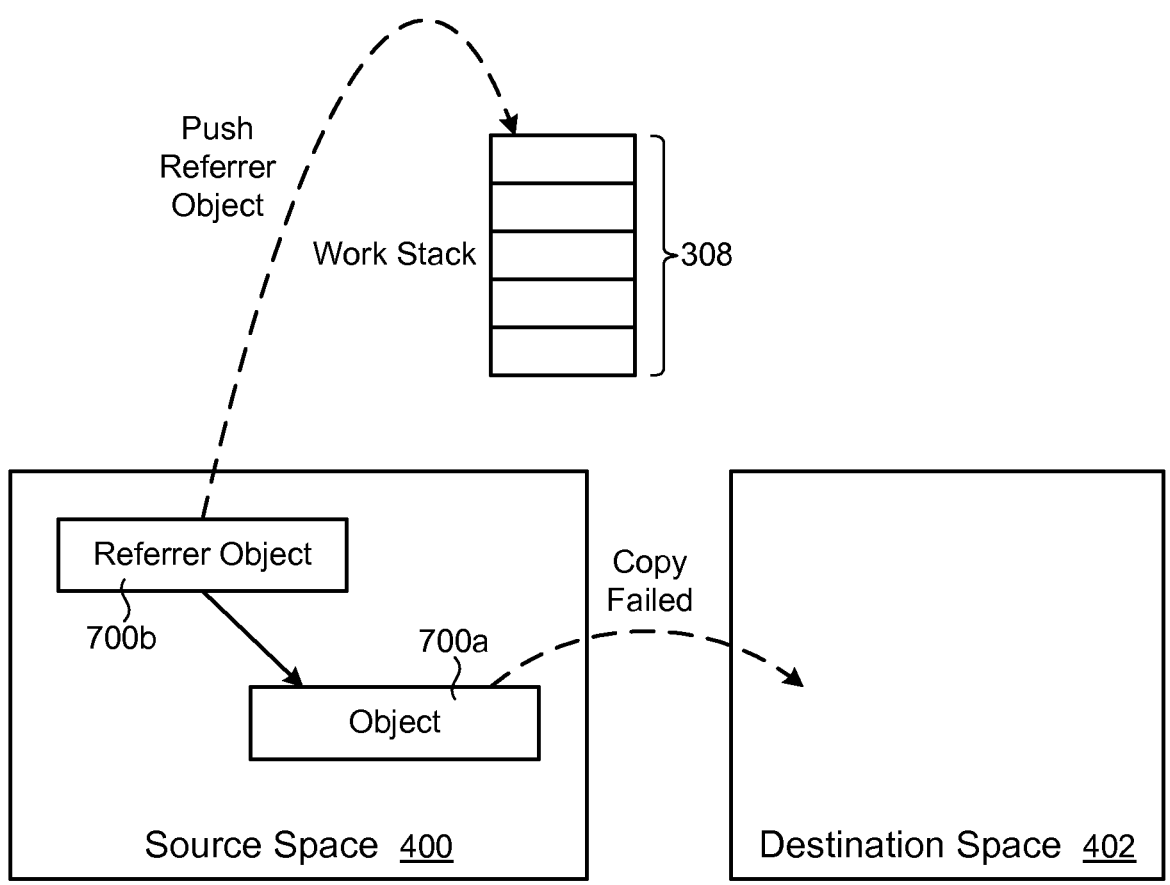
FIG. 7 shows how the work stack is used during the copy phase.

Referring to FIG. 7, as mentioned above, if, during the copy phase, the destination cache 402 associated with a thread is full, any attempt to copy an object 700a from the source space 400 to the destination cache 402 will fail. In such a case, the referrer object 700b, which has already been successfully copied to the destination space 402 and marked in the mark map cache 404, will be pushed onto the work stack 308. This will enable the mark phase to resume tracing work and reference updating terminated by the copy phase, with minimal repetition of work.

Figure 8:
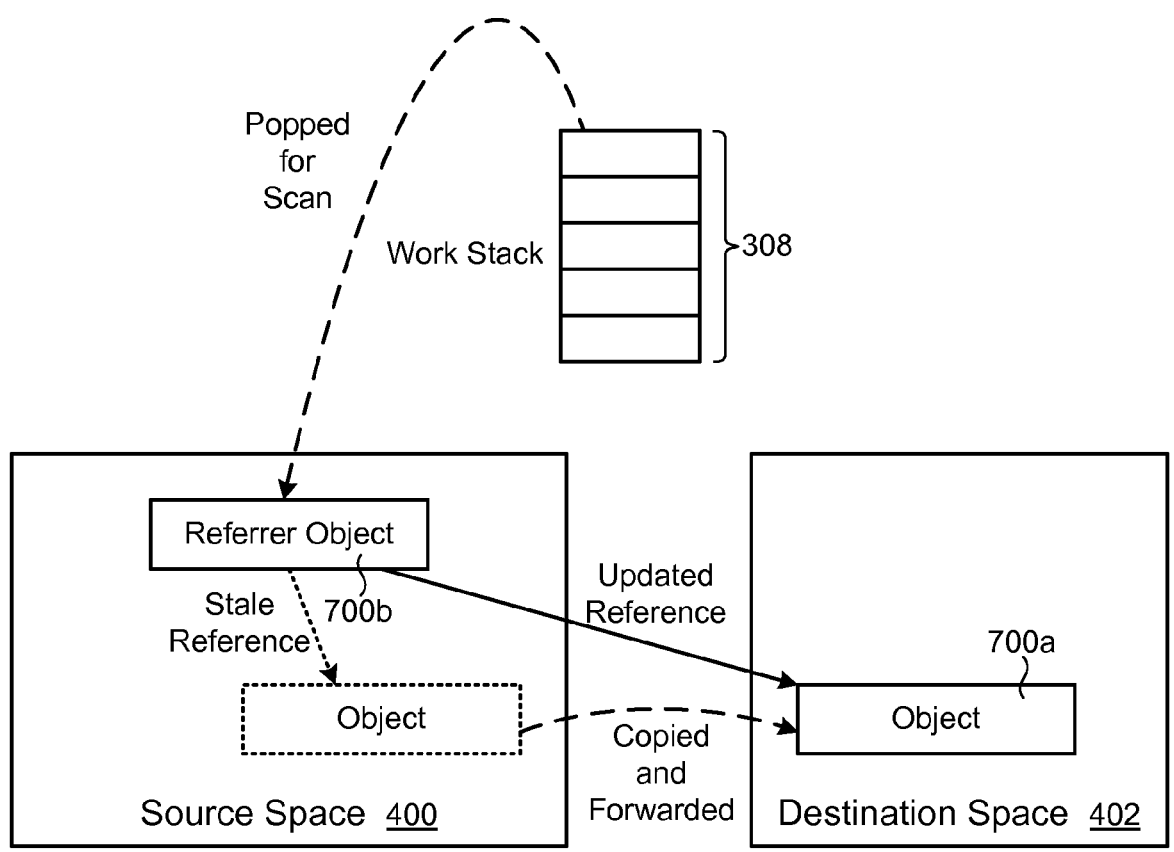
FIG. 8 shows how the work stack is used during the mark phase.

Referring to FIG. 8, as further mentioned above, the mark phase traverses the object graph by popping and scanning objects from the work stack 308. Upon popping an object 700b from the work stack 308, the mark phase performs the following for each reference slot in the object 700b: First, if the object 700a being referenced has already been copied from the source space 400 to the destination space 402 and the reference still points to the old location of the copied object, as illustrated in FIG. 8, the mark phase updates the reference slot in the referrer object 700b to reflect the object's new location. Second, if the object 700a being referenced has not been copied, it is atomically marked and, if marking is successful, the object 700a is pushed onto the work stack 308. This will allow the mark phase to resume tracing work and reference updating when the object 700a is popped from the work stack 308. In this way, the mark phase is able to resume tracing work and reference updating terminated by the copy phase, with minimal repetition of work.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in a block may occur out of the order noted in the Figures. For example, two blocks shown in succession may, in fact, be executed substantially concurrently, or the blocks may sometimes be executed in the reverse order, depending upon the functionality involved. Some blocks may be deleted or other blocks may be added depending on the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for performing garbage collection on an object heap, the method comprising:
    performing a copy phase on an object heap by copying live objects from a source space to a destination space, wherein the copy phase maintains marked bit information in at least one of a mark map cache and a mark map structure for objects copied from the source space to the destination space;
    generating an abort condition when copying an object from the source space to the destination space fails due to insufficient space in the destination space to store the object;
    terminating, in response to the abort condition, tracing work and reference updating performed in association with the copy phase, wherein the tracing work is performed to find live objects in the source space and the reference updating is performed to update references to live objects that are moved from one location to another;
    initiating, in response to the abort condition, a mark phase that marks live objects in the source space;
    resuming, by the mark phase, the tracing work and reference updating terminated by the copy phase; and
    initiating, after the mark phase, a sweep phase that frees memory in the source space not occupied by live objects.

2. The method of claim 1, wherein the mark phase is followed by a compact phase that moves live objects toward one of a high and low memory address.

3. The method of claim 1, wherein the mark phase performs the tracing work and reference updating together in a single pass.

4. The method of claim 1, wherein, in response to the abort condition, the copy phase determines a referrer object that referred to the object that failed to copy.

5. The method of claim 4, wherein the copy phase pushes the referrer object onto a work stack.

6. The method of claim 5, wherein the mark phase pops the referrer object from the work stack in order to resume the tracing work.

* * * * *